United States Patent [19]

Funaki et al.

[11] Patent Number: 5,286,762
[45] Date of Patent: Feb. 15, 1994

[54] STYRENE-BASED POLYMER MOLDINGS AND PROCESS FOR PRODUCTION THEREOF

[75] Inventors: Keisuke Funaki, Ichihara; Komei Yamasaki, Sodegaura, both of Japan

[73] Assignee: Idemitsu Kosan Co., Ltd., Tokyo, Japan

[21] Appl. No.: 44,096

[22] Filed: Mar. 8, 1993

Related U.S. Application Data

[63] Continuation of Ser. No. 642,141, Jan. 15, 1991, abandoned, which is a continuation-in-part of Ser. No. 378,384, Jul. 10, 1989, abandoned.

[30] Foreign Application Priority Data

Jul. 23, 1988 [JP] Japan .................. 63-182825

[51] Int. Cl.$^5$ .................. C08J 3/28; C08L 25/06; C08L 25/16
[52] U.S. Cl. .................. 522/3; 522/60; 522/61; 522/160; 526/346; 526/347.2; 526/160
[58] Field of Search .................. 522/160, 3, 60, 61; 526/160, 346, 347.2

[56] References Cited

U.S. PATENT DOCUMENTS

| | | | |
|---|---|---|---|
| 4,205,114 | 5/1980 | Canterino et al. | 522/160 |
| 4,225,403 | 9/1980 | Arbit | 522/160 |
| 4,281,083 | 7/1981 | Arbit | 522/160 |
| 4,367,281 | 1/1983 | Shibayama et al. | 522/160 |
| 4,680,353 | 7/1987 | Ishihara et al. | 526/159 |

FOREIGN PATENT DOCUMENTS

| | | |
|---|---|---|
| 0318794 | 6/1989 | European Pat. Off. . |
| 0322663 | 7/1989 | European Pat. Off. . |
| WO/10275 | 12/1988 | PCT Int'l Appl. . |

*Primary Examiner*—Susan Berman
*Attorney, Agent, or Firm*—Oblon, Spivak, McClelland, Maier & Neustadt

[57] ABSTRACT

A styrene-based polymer molding is obtained by molding a styrene-based polymer having mainly syndiotactic configuration and then irradiating the molding thus obtained with electron rays. This molding is excellent in heat resistance and further inexpensive. Thus the molding is useful as a material required to have high heat resistance, such as a structural material, a food container material, a food wrapping material or an electric or electronic part material, particularly as an electric or electronic part material, because it is excellent in soldering resistance.

24 Claims, No Drawings

STYRENE-BASED POLYMER MOLDINGS AND PROCESS FOR PRODUCTION THEREOF

This application is a continuation of application Ser. No. 07/642,141, filed on Jan. 15, 1991, now abandoned, which is a continuation-in-part of application Ser. No. 07/378,384, filed Jul. 10, 1989 (now abandoned).

BACKGROUND OF THE INVENTION

1. Field of the Invention

The present invention relates to styrene-based polymer moldings and a process for production thereof More particularly, it is concerned with styrene-based polymer moldings obtained by irradiating with electron rays moldings of styrene-based polymers having mainly syndiotactic configuration, and a process for efficiently producing the styrene-based polymer moldings.

2. Description of the Related Arts

A variety of resins are used in the production of electric or electronic parts. For example, in the case of connectors, the resins are often soldered for connection to lead wires, etc. The resins for producing these electric or electronic parts, are required to have heat resistance to such an extent that they are capable of maintaining their molding shapes even at a soldering temperature (usually more than 260° C.). The heat resistance to such an extent is hereinafter referred to as "soldering resistance".

As resins having such soldering resistance, polyimides, polyphenylene sulfides, etc. are known. These resins, however, have an economical disadvantage of being expensive. On the contrary, although polyethylene terephthalates (PET), etc. are relatively inexpensive, they are not durable with moldering because of their poor heat resistance.

Resins which have excellent soldering resistance and thus are suitable for producing electric or electronic parts, and further which are inexpensive, have not been obtained.

Plastic bottles which have recently been increasingly used as containers for soft drinks, are produced by injection blow molding cf PET. These plastic bottles, however, are difficult to use at temperatures exceeding the glass transition temperature (Tg) of PET. Thus it has been strongly desired to develop resins which are excellent in heat resistance and are suitable for production of food containers such as heat resistant plastic bottles for drinks.

The present inventor's group has developed styrene-based polymers, the main chain of which is mainly in the syndiotactic configuration (Japanese Patent Application Laid-Open No. 104818/1987). Among these styrene-based polymers, a styrene homopolymer has Tg of 100° C., a melting point (Tm) of 260° to 270° C. and further is relatively inexpensive. Thus it is expected to be used for producing moldings, such as electric or electronic parts and food containers, with the aforementioned performance.

Under such circumstances, the present inventors' group proposed moldings of crystalline material as obtained by molding the aforementioned styrene-based polymers followed by heat treatment (specification of Japanese Patent Application No. 3846/1988). Further investigations, however, have revealed that the moldings are not always satisfactory as electric or electronic parts with high heat resistance because they have insufficient soldering resistance, although they are much superior to conventional moldings. Moreover, it proposed moldings as obtained by injection blow molding the aftermentioned styrene-based polymers (specification of Japanese Patent Application No. 3847/1988). These moldings, however, if not subjected to heat treatment, are not durable to hot water and steam at about 100° C. In any case, it is difficult to obtain moldings suitable for food containers, etc. from the styrene-based polymers.

SUMMARY OF THE INVENTION

An object of the present invention is to provide moldings which are excellent in properties such as soldering resistance and hot water and steam resistance.

Another object of the present invention is to provide moldings which are suitable for food containers, electric or electronic parts, etc.

Further object of the present invention is to provide a process for efficiently producing the above moldings.

It has been found that the desired moldings excellent in properties such as soldering resistance and hot water and steam resistance, can be prepared by irradiating with electron rays moldings obtained by molding styrene-based polymers having mainly syndiotactic configuration.

The present invention relates to styrene-based polymer moldings as obtained by irradiating with electron rays moldings of styrene-based polymers having mainly syndiotactic configuration.

The present invention also relates to a process for producing styrene-based polymer moldings which comprises molding styrene-based polymers having mainly syndiotactic configuration and then irradiating the resultant moldings with electron rays.

The present invention further relates to a process for producing styrene-based polymer moldings which comprises melting styrene-based polymers having mainly syndiotactic configuration at a temperature exceeding the melting point thereof and quenching them to produce amorphous sheets, stretching the sheets at temperatures between the glass transition temperature and the melting point to produce stretched films, and irradiating the stretched films with electron rays.

DESCRIPTION OF PREFERRED EMBODIMENTS

Styrene-based polymers for use in production of the moldings of the present invention have mainly syndiotactic configuration.

The styrene-based polymer having mainly syndiotactic configuration means that the polymer has a stereostructure with a configuration that is mainly syndiotactic, i.e., the stereostructure in which phenyl groups or substituted phenyl groups as side chains are located alternately in opposite directions relative to the main chain consisting of carbon-carbon bonds. The tacticity is quantitatively determined by the nuclear magnetic resonance method using carbon isotope $^{13}C$-NMR)method. The tacticity as determined by the $^{13}C$-NMR method can be indicated in terms of proportions of structural units continuously connected to each other, i.e., a racemic diad in which two structural units are connected to each other, a racemic triad in which three structural units are connected to each other, or racemic pentad in which five structural units are connected to each other. Styrene-based polymers having mainly syndiotactic configuration of the present invention are either homopolymers of styrene (that is, polystyrene) or copolymers of at least 70 mol % styrene monomer and up to 30% of a second monomer selected from alkylstyrene, halogenated styrene, alkoxystyrene, vinyl benzoate and mixtures thereof. The mainly syndiotactic configuration is defined as having such syndiotacticity that the proportion of racemic diad is at least 75% and preferably at least 85%, or the proportion of racemic pentad is at least 30% and preferably at least 50% and very preferably at least 70% (see Japanese Patent Application Laid-Open No. 187708/1987).

The above alkylstyrene monomer includes methylstyrene, ethylstyrene, isopropylstyrene, tert-butylstyrene and the like. Specific examples of the halogenated styrene monomer are chlorostyrene, bromostyrene, fluorostyrene and the like. The alkoxystyrene monomer includes methoxystyrene, ethoxystyrene and the like. The most preferred monomers are p-methylstyrene, m-methylstyrene, p-tert-butylstyrene, p-chlorostyrene, m-chlorostyrene, p-fluorostyrene.

The styrene-based polymer used in the present invention has a weight average molecular weight of about 100,000 to 1,500,00 and preferably has a weight average molecular weight of 150,000 to 1,000,000.

The styrene-based polymers having mainly syndiotactic configuration have a melting point of 160° to 310° C. and are much superior in heat resistance to the conventional styrene-based polymers having atactic configuration.

The styrene-based polymers having mainly syndiotactic configuration can be produced by polymerizing the monomers by the use of a catalyst comprising a titanium compound and a condensate of water and trialkylaluminum in the presence of an inert hydrocarbon solvent or in the absence of a solvent.

Additives, such as a thermoplastic resin, rubber, an inorganic filler, an antioxidant, a nucleating agent, a plasticizer, a compatibilizer agent, a colorant, and an antistatic agent can be added to the styrene-based polymers for use in production of the moldings of the present invention.

To accelerate the electron ray irradiation effect, a cross-linking agent and a cross-linking aid can be added.

Various kinds of antioxidants can be used in the present invention, but particularly preferable are phosphorus antioxidants including monophosphites and diphosphites, and phenolic antioxidants. Typical examples of the monophosphites are tris(2,4-di-tert-butylphenyl)phosphite, tris(mono or di-nonylphenyl)phosphite and the like.

Preferable diphosphites are the phosphorus compounds represented by the formula:

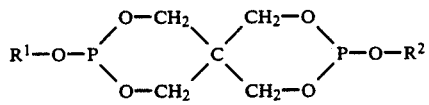

(wherein R$^1$ and R$^2$ are independently an alkyl group having 1 to 20 carbon atoms, a cycloalkyl group having 3 to 20 carbon atoms, or an aryl group having 6 to 20 carbon atoms).

Typical examples of the formula are distearylpentaerythritol diphosphite, dioctylpentaerythritol diphosphite, diphenylpentaerythritol diphosphite, bis(2,4-di-tert-butyl-4-methylphenyl)pentaerythritol diphosphite, dicyclohexylpentaerythritol diphosphite and the like.

As for phenolic antioxidant, various known compounds can be used. Representative examples of them are 2,6-di-tert-butyl-4-methylphenol, 2,6-diphenyl-4-methoxyphenol, 2,2'- methylenebis(6-tert-butyl-4-methylphenol), 2,2'-methylenebis(4-methyl-6-(alpha-methylcyclohexyl)phenol), 1,1-bis(5-tert-butyl-4-hydroxy-2-methylphenyl)butane, 2,2'-methylenebis(4-methyl-6-cyclohexylphenol), 2,2'-methylenebis(4-methyl-6-nonylphenol), 1,1,3-tris(5-tert-butyl-4-hydtoxy-2-methylphenyl)butane, 2,2-bis(5-tert-butyl 4-hydroxy-2-methylphenyl)-4-n-dodecylmelcaptobutane, ethyleneglycol-bis(3,3-bis(3-tert-butyl-4-hydroxyphenyl)butylate), 1-1-bis(3,5-dimethyl-2-hydroxyphenyl)-3-(n-dodecylthio)butane, 4,4'-thiobis(6-tert-butyl-3-methylphenol), 1,3,5-tris(3,5-di-tert-butyl-4-hydroxybenzyl)-2,4,6-trimethylbenzene, 2,2-bis(3,5-di-tert-butyl-4-hydroxybenzyl)malonic acid dioctadecyl ester, n-octadecyl-3-(4-hydroxy-3,5-di-tert butylphenyl)propionate, tetrakis(methylene(3,5-di-tert-butyl-4 hydroxyhydrocinnamate))methane and the like.

The above antioxidant is compounded in the amount of 0.0001 to 2 parts by weight preferably 0.001 to 1 parts by weight per 100 parts by weight of the styrene-based resin having mainly syndiotactic configuration mentioned before.

If the amount of the antioxidant compounded is less than 0.0001 parts by weight, insufficient effect can be obtained since the molecular weight drops steeply. If it is more than 2 parts by weight, on the other hand, mechanical strength is lowered.

Thermoplastic resins which can be used include styrene-based polymers such as atactic polystyrene, isotactic polystyrene, an AS resin, and an ABS resin, polyesters such as polyethylene terephthalate; polycarbonates; polyethers such as polyphenylene oxide, polysulfone, and polyethersulfone; condensation polymers such as polyamide, polypheylene sulfide (PPS), and polyoxymethylene; acryl-based polymers such as polyacrylic acid, polyacrylate and polymethyl methacrylate; polyolefins such as polyethylene, polypropylene, polybutene, poly(4-methyl-pentene-1), and an ethylene-propylene copolymer; and halogenated vinyl polymers such as polyvinyl chloride, polyvinylidene chloride, and polyvinylidene fluoride.

Although various rubbers can be used, rubber-like copolymers containing a styrene-based compound as one component are most suitable. Examples are rubber obtained by partially or fully hydrogenating the butadiene portion of a styrene-butadiene block copolymer (SEBS), styrene-butadiene copolymer rubber (SBR), methyl acrylate-butadiene-styrene copolymer rubber, acrylonitrile-butadiene-styrene copolymer rubber (ABS rubber), acrylonitrile-alkyl acrylate-butadienestyrene copolymer rubber (AABS), methyl methacrylate-alkyl acrylate-styrene copolymer rubber (MAS). and methyl methacrylate-alkyl acrylate-butadiene-styrene copolymer rubber (MABS). These rubber-like copolymers containing a styrene-based compound as one component have good dispersibility in the styrene-based polymers having mainly syndiotactic configuration because they have the styrene unit. Therefore, they can markedly improve the physical properties of the moldings of the present invention.

Other rubbers which can be used include natural rubber, polybutadiene, polyisoprene, polyisobutylene, neoprene, ethylene-propylene copolymer rubber, polysulfide rubber, thiokol rubber, acrylic rubber, urethane rubber, silicone rubber, epichlorohydrin rubber, polyether ester rubber, and polyester ester rubber.

The inorganic filler is not critical in shape and may be fibrous, granular or powdery. Examples of fibrous inorganic fillers are glass fibers, carbon fibers, and alumina fibers Examples of granular or powdery inorganic fillers are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

As the cross-linking agent, a suitable amount of hydroperoxides such as tert-butyl hydroperoxide, cumene hydroperoxide, diisopropylbenzene peroxide, 2,5-dimethyl-2,5-dihydroperoxy hexane, or 2,5-dimethyl-2,5-dihydroxyperoxyhexane-3, dialkyl peroxides, ketone peroxides, diacyl peroxides, or peroxyesters can be used.

Cross-linking aids which can be used include quinone dioximes such as p-quinone dioxime or p,p-dibenzoyl-quinone dioxime, methacrylates such as polyethylene glycol dimethacrylate, allyl compounds, and maleimide compounds.

In accordance with the present invention, the aforementioned styrene-based polymer or a polymer composition containing the styrene-based polymer and an anitoxidant, a cross-linking agent, etc. is molded and the molding thus obtained is irradiated with electron rays.

In connection with the molding prior to irradiating with electron rays, there are no special limitations to the shape, the molding method, the degree of crystallization, etc. They can be determined appropriately depending on characteristics, etc. required for the desired molding. For example, the shape of the molding can be film, sheet, laminated film or three dimensional structure such as a container. As for the molding method; extrusion molding, injection molding, blow molding or inflation molding can be applied depending on the shape of the molding. In connection with the degree of crystallization, the molding can be crystalline or amorphous. If necessary, a molding subjected to heat treatment after molding can be used. In the injection molding; a molding obtained by melting the polymer at a temperature exceeding the melting point thereof and molding at any suitable die temperature of not more than 200° C., or a molding subjected to heat treatment, can be used.

In the present invention, as well as a stretched film or a stretched film in which the degree of crystallization is increased by heat treatment, a molding obtained by blow molding or injection molding, a sheet obtained by extrusion molding using a T die, for example, and so forth are preferably used.

The above stretched film can be produced by, for example, the method disclosed in the specification of Japanese Patent Application No. 3847/1988, more specifically by melting a styrene-based polymer having mainly syndiotactic configuration at a temperature exceeding the melting temperature thereof and then cooling to produce an amorphous sheet or semi-crystallized sheet, and then stretching the sheet at a temperature between the glass transition temperature and the melting point The degree of crystallization of the stretched film can be more increased by heating it at a temperature between the glass transition temperature and the melting point.

In the present invention, the above molding is irradiated with electron rays This irradiation with electron rays causes changes such as cross-linking in the styrene-based polymer, which results in an improvement in the thermal properties (e.g., soldering resistance and hot water resistance) of the molding. If irradiation with electron rays is not applied, thermal properties of the molding are insufficiently improved and thus the objects of the present invention cannot be attained.

The apparatus for use in irradiating with electron rays the molding can be of an electrostatic acceleration system or of a high frequency acceleration system. The electron generation mechanism may be any of a hot cathode system, a cold cathode system, and an field emission system. The irradiation method may be of the scanning type or non-scanning type. In particular, a combination in which the apparatus is of the electrostatic acceleration system, the electron generation mechanism is of the hot cathode system, and the irradiation method is of the scanning type, is preferred.

The degree of irradiation with electron rays is determined depending on the depth of treatment in the molding, i.e., degree of cross-linking, etc. For example, when only the surface of the molding is cross-linked, the amount of electron rays irradiated may be small as compared with the case in which the whole molding is cross-linked. The amount of electron rays irradiated is most suitably indicated in an absorption dose. Usually the absorption dose is preferably 0.01 to 80 Mrad when a cross-linking agent is used, and 1 to 100 Mrad when no cross-linking agent is used. An acceleration voltage is controlled depending on the thickness of the molding, the depth to which the molding is treated, and it is usually preferred to be about 100 kV to 3 MV. The electron current is preferably about 1 to 300 mA.

When films after irradiation with electron rays are laminated and used in the form of a laminated film, the type of the resin of films to be laminated is determined taking into consideration characteristics required for the desired laminated film. For example, when high mechanical strength is required for the laminated film, a thermoplastic resin such as a polyester resin, a polyamide resin, a polycarbonate resin, a polyolefin resin or a halogenated vinyl polymer is chosen. When gas barrier properties are important, a polyester resin, e.g., PET, a polyamide resin, PPS, a polyvinyl alcohol resin and its derivatives, or ethylene vinyl acetate is chosen. If other thermoplastic resins having a low melting point are used, a laminated film having good heat-sealing properties can be obtained.

The styrene-based polymer moldings of the present invention, as described above, have excellent heat resistance and are inexpensive. Therefore, they are useful for those required to have high heat resistance, such as structural materials, food container materials, food wrapping materials (single layer or multi-layer) or electric or electronic parts materials.

In particular, they are effective in the production of electric or electronic parts needing soldering because they are excellent in soldering resistance.

The present invention is described in greater detail with reference to the following examples

PREPARATION EXAMPLE

Production of Styrene-Based Polymer having mainly Syndiotactic Configuration

Two L (L=liter) of toluene as a solvent, and 1 mmol of cyclopentadienyltitanium trichloride and 0.6 mol (as aluminum atom) of methylaluminoxane as catalyst components were placed in a 2-liter reactor, and 3.6 L of styrene was added thereto and polymerized for one hour at 20° C.

After completion of the reaction, the product was washed with a mixture of hydrochloric acid and methanol to decompose and remove the catalyst components, and then dried to obtain 330 g of a polymer.

This polymer (polystyrene) was subjected to Soxhlet extraction using methyl ethyl ketone as a solvent to obtain 95% by weight of an extraction residue. The polymer had a weight average molecular weight of 290,000, a number average molecular weight of 158,000, and a melting point of 270° C. In a nuclear magnetic resonance using carbon isotope ($^{13}$C-NMR) analysis of the polymer, an absorption at 145.35 ppm ascribable to the syndiotactic configuration was observed. The Syndiotacticity in terms of racemic pentad as calculated from the peak area was 96%.

EXAMPLE 1

100 parts by weight of polystyrene powder having syndiotacticity as obtained in the Preparation Example, and 0.7 part by weight of bis(2,4-di-tert-butylphenyl) pentaerythritol diphosphite and 0.1 part by weight of 2,6-di-tert-butyl-4-methylphenol as antioxidants were dry blended. The resulting mixed powder was melted at 296° C. and quenched to produce an amorphous press sheet.

This press sheet was irradiated with electron rays at an acceleration voltage of 500 kV by the use of a scanning type electron ray processing apparatus, in such a manner that the absorption dose was 50 Mrad.

Heat resistance of the press sheet is shown in Table 1.

EXAMPLE 2

An amorphous sheet was produced in the same manner as in Example 1 and stretched to a draw ratio of 3.5 times the original length in both TD (transverse direction) and MD (machine direction) at 120° C. by the use of a table tentor.

The stretched film was irradiated with electron rays at an acceleration voltage of 500 kV and an electron current of 10 mA in such a manner that the absorption dose was 40 Mrad.

Heat resistance of the stretched film is shown in Table 1.

EXAMPLE 3

The same stretched film as obtained in Example 2 was irradiated with electron rays in the same manner as in Example 2 except that the stretched film was heated at 260° C. under tension prior to irradiation with electron rays.

The results are shown in Table 1.

EXAMPLE 4

The mixed powder obtained in Example 1 was melted and pelletized. The resulting pellets were molded by the use of an injection molding machine to obtain a test piece.

This test piece was irradiated with electron rays at an acceleration voltage of 500 kV and an electron current of 10 mA, in such a manner that the absorption dose was 60 Mrad.

The results are shown in Table 1.

COMPARATIVE EXAMPLE 1

Heat resistance of the sheet as obtained in Example 1 but prior to irradiation with electron rays, was evaluated.

The results are shown in Table 1.

COMPARATIVE EXAMPLE 2

Heat resistance of the film as obtained in Example 2 but prior to irradiation with electron rays, was evaluated.

The results are shown in Table 1.

COMPARATIVE EXAMPLE 3

Heat resistance of the film as obtained in Example 3 but prior to irradiation with electron rays, was evaluated.

The results are shown in Table 1.

COMPARATIVE EXAMPLE 4

Heat resistance of the test piece as obtained in Example 4 but prior to irradiation with electron rays, was evaluated.

The results are shown in Table 1.

REFERENCE EXAMPLE A

Production of Polystyrene having Syndiotactic Configuration

2 L (L=liter) of toluene as a solvent, and 5 mmol of tetraethoxytitanium and 50 mmol (as aluminum atom) of methylaluminoxane were placed in a reactor, and then 15 L of styrene was added at 50° C. and polymerized for 4 hours.

After polymerization, the reaction product was washed with a mixture of hydrochloric acid and methanol to decompose and remove the catalyst components, and then dried to obtain 2.5 kg of a styrene resin (polystyrene). The polymer was subjected to Soxhlet extraction using methyl ethyl ketone as a solvent to obtain 95% by weight of an extraction residue. The weight average molecular weight of the residue was 800,000. A $^{13}$C-NMR analysis (solvent: 1,2-dichlorobenzene) showed a peak at 145.35 ppm, ascribable to the syndiotactic structure, and the syndiotacticity in terms of the racemic pentad as calculated from the peak area was 96%.

EXAMPLE 5

The same procedure was carried out as in Example 3 except for using the syndiotactic polystyrene obtained in the above Reference Example A and changing the absorption dose of an electron ray to 60 Mrad. The results are shown in Table 1.

REFERENCE EXAMPLE B

Production of Styrene Copolymer having high degree of Syndiotactic Configuration 6 L of toluene as a solvent, and 5 mmol of tetraethoxytitanium and 500 mmol (as aluminum atom) of methylaluminoxane as catalyst components were placed in a reactor, and then 48.75 mol of styrene and 1.25 mol of p-methylstyrene were added thereto at 50° C. and polymerized for 2 hours.

After polymerization, the reaction product was washed with a mixture of hydrochloric acid and methanol to decompose and remove the catalyst components, and then dried to obtain 640 g of a copolymer. This copolymer was subjected to Soxhlet extraction using methyl ethyl ketone as a solvent to obtain 80% by weight of an extraction residue. The copolymer, the residue, had a weight average molecular weight of 440,000, a number average molecular weight of 240,000 and a melting point of 255° C. The p-methylstyrene unit content of the copolymer was 5 mol %.

A $^{13}$C-NMR analysis of the copolymer showed peaks at 145.11 ppm, 145.22 ppm and 142.09 ppm, ascribable to the syndiotactic structure, and the syndiotacticity in terms of the racemic pentad as calculated from the peak area was 72%.

EXAMPLE 6

The same procedure was carried out as in Example 3 except for using the syndiotactic (styrene-p-methylstyrene) copolymer obtained in the above Reference Example B, changing the heat treatment temperature to 240° C. and changing the absorption dose of an electron ray to 20 Mrad. The results are shown in Table 1.

COMPARATIVE EXAMPLE 5

The same procedure was carried out as in Example 2 except for using an atactic polystyrene (trade name: HH30E, produced by Idamitsu Petrochemical Co., Ltd.). The results are shown in Table 1.

COMPARATIVE EXAMPLE 6

The same procedure was carried out as in Comparative Example 5 except for not irradiating with an electron ray. The results are shown in Table 1.

taining at least 70 mol % styrene and containing alkylstyrene as a comonomer.

2. The molding as defined in claim 1, which is in a film form, a sheet form or a laminated film form.

3. The molding as defined in claim 1, which is in the form a three-dimensional structure.

4. The molding as defined in claim 1, which is in a stretched film form.

5. The molding as defined in claim 1, which was irradiated with electron ray at an acceleration voltage of 100 kV to 3 MV.

6. The molding as defined in claim 1, wherein the polymer was compounded with a cross-linking agent and the molding was irradiated with electron rays at an absorption dose of 0.01 to 80 Mrad.

7. The molding as defined in claim 6, wherein the styrene-based polymer is polystyrene.

8. The molding as defined in claim 1, wherein the polymer was compounded without a cross-linking agent and the molding was irradiated with electron rays at an absorption dose of 1 to 100 Mrad.

9. The molding as defined in claim 8, wherein the styrene-based polymer is polystyrene.

10. The molding as defined in claim 1, which was irradiated with electron rays at an electron current of 1 to 300 mA.

11. The molding as defined in claim 1 which is in sheet form produced by a process which comprises melting a styrene-based polymer having mainly syndiotactic configuration at a temperature exceeding the melting point thereof and then cooling to produce an amorphous or semi-crystallized sheet, stretching the sheet at a temperature between the glass transition temperature and the melting point to produce a stretched film, and then irradiating the stretched film with electron rays.

12. The molding as defined in claim 1, wherein the styrene-based polymer is a copolymer of styrene and methylstyrene, ethylstyrene, isopropyl styrene or tert-butyl styrene.

TABLE 1

| No. | Polymer | Mw | Molding | Absorption Dose in Irradiation with Electron Rays (Mrad) | Appearance |
|---|---|---|---|---|---|
| Example 1 | SPS | 290,000 | Sheet | 50 | Transparent |
| Example 2 | SPS | 290,000 | Film | 40 | Transparent |
| Example 3 | SPS | 290,000 | Film | 40 | Transparent |
| Example 4 | SPS | 290,000 | Parallelepipedon | 60 | White |
| Comparative Example 1 | SPS | 290,000 | Sheet | — | Transparent |
| Comparative Example 2 | SPS | 290,000 | Film | — | Transparent |
| Comparative Example 3 | SPS | 290,000 | Film | — | Transparent |
| Comparative Example 4 | SPS | 290,000 | Parallelepipedon | — | White |
| Example 5 | SPS | 800,000 | Film | 60 | Transparent |
| Example 6 | Copolymer | 440,000 | Film | 20 | Transparent |
| Comparative Example 5 | aPS | 270,000 | Film | 40 | Transparent |
| Comparative Example 6 | aPS | 270,000 | Film | — | Transparent |

| No. | Influences of Steam*$^1$ | Soldering Resistance*$^2$ | Deformation at 120° C. (%) |
|---|---|---|---|
| Example 1 | none | — | — |
| Example 2 | none | Slightly shrinked | — |
| Example 3 | none | No change | 1.5 |
| Example 4 | none | No change | — |
| Comparative Example 1 | Deformed | — | — |
| Comparative Example 2 | Shrinked | Shrinked | — |
| Comparative Example 3 | none | Shrinked | 5 |
| Comparative Example 4 | Slightly deformed | Change in the Surface | — |
| Example 5 | none | No change | 1.2 |
| Example 6 | none | Slightly shrinked | 1.0 |
| Comparative Example 5 | Deformed | melted | 65 |
| Comparative Example 6 | Deformed | melted | 67 |

*$^1$Treated at 120° C. for 100 hours according to the Pressure Cooker Test.
*$^2$Contacted at 260° C. for 30 seconds according to JIS C0050.

What is claimed is:

1. A styrene-based polymer molding which is produced by irradiating with electron rays a molding of a styrene-based polymer having a syndiotactic configuration with a syndiotacticity of at least 70% in racemic pentad; said styrene-based polymer having a weight average molecular weight of about 150,000 to 1,000,000 being a homopolymer of styrene or a copolymer con- 13. The molding of claim 12, wherein the styrene-based polymer is a copolymer containing 70% styrene.

14. The molding of claim 13, wherein the styrene-based polymer is a copolymer containing 85% styrene.

15. The molding of claim 14, wherein the styrene-based polymer is a copolymer containing 95% styrene.

16. The molding of claim 15, wherein the styrene-based polymer is a copolymer containing 95% styrene and 5% methylstyrene or ethyl styrene.

17. The molding of claim 1, wherein said styrene based polymer is polystyrene, the syndiotacticity in terms of the racemic pentad is 96%, the weight average molecular weight is 290,000, and the styrene-based polymer has a number average molecular weight of 158,000.

18. The molding of claim 1, wherein the styrene-based polymer is a copolymer of styrene and 5 mole % p-methylstyrene, having a weight average molecular weight of 240,000 and a syndiotacticity in terms of the racemic pentad of 72%.

19. The molding of claim 1, wherein said styrene-based polymer is polystyrene, the weight average molecular weight is 800,000 and the syndiotacticity in terms of the racemic pentad is 96%.

20. The molding of claim 1, wherein said styrene-based polymer is polystyrene.

21. A process for producing the styrene-based polymer molding of claim 1, which comprises molding the styrene-based polymer having syndiotactic configuration and then irradiating the resultant molding with electron rays.

22. The process as defined in claim 21, wherein the styrene-based polymer contains a cross-linking agent and the molding is irradiated with electron rays at an absorption dose of 0.01 to 80 Mrad.

23. The process as defined in claim 21, wherein the molding is irradiated with electron rays at an absorption dose of 1 to 100 Mrad when it does not contain a cross-linking agent.

24. A process for producing the styrene-based polymer molding of claim 1 which comprises melting the styrene-based polymer having mainly syndiotactic configuration at a temperature exceeding the melting point thereof and then cooling to produce an amorphous or semi-crystallized sheet, stretching the sheet at a temperature between the glass transition temperature and the melting point to produce a stretched film, and then irradiating the stretched film with electron rays.

* * * * *